US011630805B2

(12) United States Patent
Delaney et al.

(10) Patent No.: US 11,630,805 B2
(45) Date of Patent: Apr. 18, 2023

(54) METHOD AND DEVICE TO AUTOMATICALLY IDENTIFY THEMES AND BASED THEREON DERIVE PATH DESIGNATOR PROXY INDICIA

(71) Applicant: Lenovo (Singapore) Pte. Ltd., New Tech Park (SG)

(72) Inventors: Mark Patrick Delaney, Raleigh, NC (US); Nathan J. Peterson, Oxford, NC (US); Arnold S. Weksler, Raleigh, NC (US); John Carl Mese, Cary, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 323 days.

(21) Appl. No.: 17/132,198

(22) Filed: Dec. 23, 2020

(65) Prior Publication Data

US 2022/0197866 A1 Jun. 23, 2022

(51) Int. Cl.
| | | |
|---|---|---|
| *G06F 16/955* | (2019.01) | |
| *G06F 16/16* | (2019.01) | |
| *G06F 40/258* | (2020.01) | |
| *G06F 40/30* | (2020.01) | |
| *H04L 51/046* | (2022.01) | |

(Continued)

(52) U.S. Cl.
CPC ........ *G06F 16/164* (2019.01); *G06F 16/9566* (2019.01); *G06F 40/258* (2020.01); *G06F 40/30* (2020.01); *G06V 30/413* (2022.01); *H04L 51/046* (2013.01); *H04L 51/08* (2013.01); *H04L 51/18* (2013.01); *H04L 51/42* (2022.05)

(58) Field of Classification Search
CPC .. G06F 16/164; G06F 16/9566; G06F 16/957; G06F 40/258; G06F 40/30; G06V 30/412; G06V 30/413; H04L 51/046; H04L 51/08; H04L 51/18; H04L 51/42
See application file for complete search history.

(56) References Cited

U.S. PATENT DOCUMENTS

| | | | | |
|---|---|---|---|---|
| 7,159,014 B2 * | 1/2007 | Kausik | ...................... | G06F 9/54 709/217 |
| 8,886,576 B1 * | 11/2014 | Sanketi | .................. | G06N 20/00 706/47 |

(Continued)

*Primary Examiner* — Scott T Baderman
*Assistant Examiner* — Mario M Velez-Lopez
(74) *Attorney, Agent, or Firm* — The Small Patent Law Group LLC; Dean D. Small (57) ABSTRACT

Methods, devices and computer program products are provided that, under control of one or more processors, perform resource theme identification (RTI) automatically by; accessing an active resource that includes a path designator (PD) element that includes at least a portion of a path designator for a resource; analyzing the active resource to identify a text element, an audio element and/or an image element; analyzing the text/image element utilizing an RTI algorithm, that applies at least one of natural language understanding (NLU) or image recognition (IR), to identify the one or more themes; deriving proxy indicia based on the theme(s); substituting, into the active resource, the proxy indicia for the path designator to present the proxy indicia in place of the path designator, the proxy indicia linked to the path designator; and displaying the active resource including the proxy indicia.

20 Claims, 8 Drawing Sheets

(51) Int. Cl.
    *H04L 51/08*     (2022.01)
    *H04L 51/18*     (2022.01)
    *G06V 30/413*     (2022.01)
    *H04L 51/42*     (2022.01)

(56) References Cited

U.S. PATENT DOCUMENTS

| | | | |
|---|---|---|---|
| 10,521,486 B2* | 12/2019 | Cordasco | G06F 16/986 |
| 11,023,720 B1* | 6/2021 | Desai | G06N 3/0454 |
| 11,368,414 B1* | 6/2022 | Shetty | G06F 16/9566 |
| 11,388,248 B1* | 7/2022 | Scotney | H04L 67/53 |
| 11,397,519 B2* | 7/2022 | Qiu | G06F 16/245 |
| 2013/0104065 A1* | 4/2013 | Stecher | G06F 3/04842 |
| | | | 715/767 |
| 2014/0157112 A1* | 6/2014 | Miller | H04L 67/568 |
| | | | 715/237 |
| 2015/0334159 A1* | 11/2015 | Li | H04L 67/02 |
| | | | 709/203 |
| 2017/0208025 A1* | 7/2017 | Chakra | H04L 51/18 |
| 2017/0315982 A1 | 11/2017 | Zhou et al. | |
| 2018/0032489 A1 | 2/2018 | Zhou | |
| 2018/0189414 A1 | 7/2018 | Cordasco | |
| 2018/0189693 A1* | 7/2018 | Newhouse | G06Q 10/0631 |
| 2018/0196644 A1* | 7/2018 | Bhakar | G06F 9/44526 |
| 2018/0217986 A1* | 8/2018 | Pai | G06F 16/434 |
| 2020/0293581 A1 | 9/2020 | Clauset et al. | |
| 2021/0240758 A1* | 8/2021 | Lee | G06F 16/583 |
| 2022/0245327 A1* | 8/2022 | Bradley | G06N 20/00 |

* cited by examiner

METHOD AND DEVICE TO AUTOMATICALLY IDENTIFY THEMES AND BASED THEREON DERIVE PATH DESIGNATOR PROXY INDICIA

BACKGROUND

Embodiments herein generally relate to methods and devices to automatically identify themes and based thereon derive path designator proxy indicia.

Today, individuals utilize computing devices to access and navigate through a wide variety of resources, such as SMS text messages, email, webpages, Word files, Excel files, Notes boards and the like. Often, one or more uniform record locators (URL) are shared within a webpage, email and other resource, with the URL designating a path to a different destination resource (e.g., another webpage). The URL often includes a long and complex path, such as:

http://my.companyserver.com/Personal/jsmith/_layouts/
15/xlview    er.aspx?id=/Personal/jsmith/Documents/
Shared%20with%20Everyone/
Renee%20Ure%20Chief)/%20of%20Staff/
Client%20Facing%9%252D92DC%252DC205F
C9919C6%25

To navigate to the destination resource, a user may "click on" the URL path. In some instances, simply "clicking on" the path will not result in rerouting a users browser to the correct destination path. Accordingly, a user may need to copy the entire URL, open a separate browser and paste the URL into the appropriate field in the browser. Still, in some instances the series of operations may not result in the destination resource correctly loading.

Utilizing URL links embedded within an email or webpage offers an inconvenient manner of navigation to the destination resource and a poor user experience.

As another example, when a user generates a new document in various document management applications, such as Word, Excel, and the like, a need arises to save the document. When the user begins to save the document, the document management application initially populates the save-as field with a first line of text from the file. For example, when composing a letter and initiating a "file save" operation, the Word application may initially populate the save-as file name field with the beginning portion of the text from the letter, such as "Dear John", the date, or the first line of text in the document. The recommended filename presents a risk that a file may be misnamed, further creating a poor user experience.

A need remains for an improved manner to parse content of a resource and suggest intuitive text descriptions for active filenames and/or destination resources.

SUMMARY

In accordance with embodiments herein, a method is provided that comprises: under control of one or more processors included program instructions to perform resource theme identification (RTI) automatically; accessing an active resource that includes a path designator (PD) element that includes at least a portion of a path designator for at least one of the active resource or a destination resource; analyzing the active resource at a computing device to identify content elements, the content elements including one or more text/image elements, the text/image element including at least one of a text element, an audio element or an image element related to one or more themes associated with one of the active resource or the destination resource; analyzing the text/image element utilizing an RTI algorithm, that applies at least one of natural language understanding (NLU) or image recognition (IR), to identify the one or more themes; deriving proxy indicia based on the one or more themes; substituting, into the active resource, the proxy indicia for the path designator to present the proxy indicia in place of the path designator, the proxy indicia linked to the path designator; and displaying the active resource including the proxy indicia.

Additionally or alternatively, the active resource represents an electronic message that is opened by an electronic messaging application operated by the one or more processors on the computing device. Additionally or alternatively, the analyzing operation includes applying the NLU algorithm to one or more text elements within the electronic message to identify the one or more themes. Additionally or alternatively, the analyzing operation applies the IR algorithm to one or more image elements within the electronic message to identify the one or more themes. Additionally or alternatively, the analyzing operation applies, as the IR algorithm, a video recognition (VR) functionality to identify at least one of gestures or other video components of one or more video elements within the electronic message to identify the one or more themes. Additionally or alternatively, the NLU and IR algorithms separately, or in combination, identify the one or more themes associated with the corresponding content elements. Additionally or alternatively, the RTI algorithm identifies the one or more themes to represent at least one of: i) a subject or topic discussed in the text of the electronic message, or ii) a subject or topic presented in still images or video within the electronic message. Additionally or alternatively, the one or more themes include one or more of: i) a designation of an entity, ii) a purpose or request, iii) an action to be taken.

Additionally or alternatively, the active resource includes a document opened in a document management program and a save window opened in the document management program, the method further comprising: identifying a text string located at a beginning of the document, the displaying the PD element including displaying the text string into a save-as field in the save window as a prepopulated candidate filed name, the candidate file name representing the PD element. Additionally or alternatively, the RTI algorithm applies the NLU to the one or more text/image elements in the document to identify the one or more themes and substitutes the proxy indicia into the save-as field for the candidate file name.

In accordance with embodiments herein, the devices provided that comprises: memory to store program instructions; one or more processors, when executing the program instructions, to perform automatic resource theme identification (RTI) by: accessing an active resource that includes a path designator (PD) element that includes at least a portion of a path designator for at least one of the active resource or a destination resource; and analyzing the active resource at a computing device to identify content elements, the content elements including one or more text/image elements, the text/image element including at least one of a text element, an audio element or an image element related to one or more themes associated with one of the active resource or the destination resource; analyzing the text/image element utilizing an RTI algorithm, that applies at least one of natural language understanding (NLU) or image recognition (IR), to identify the one or more themes; and deriving proxy indicia based on the one or more themes; substituting, into the active resource, the proxy indicia for the path designator to present the proxy indicia in place of the path designator, the proxy indicia linked to the path designator; and a display to display the active resource including the proxy indicia.

Additionally or alternatively, the active resource represents an electronic message that is opened by an electronic messaging application operated by the one or more processors on the computing device. Additionally or alternatively, the one or more processors are configured to apply the NLU algorithm to one or more text elements within the electronic message to identify the one or more themes. Additionally or alternatively, the one or more processors are configured to apply the IR algorithm to one or more image elements within the electronic message to identify the one or more themes. Additionally or alternatively, the one or more processors are configured to apply, as the IR algorithm, a video recognition (VR) functionality to identify at least one of gestures or other video components of one or more video elements within the electronic message to identify the one or more themes. Additionally or alternatively, the memory is configured to store the document management program, the active resource including a document opened in the document management program and a save window opened in the document management program, the one or more processors configured to: identify a text string located at a beginning of the document, the display configured to display the text string into a save-as field in the save window as a prepopulated candidate filed name, the candidate file name representing the PD element. Additionally or alternatively, the one or more processors are configured to apply the NLU to the one or more text/image elements in the document to identify the one or more themes and to substitute the proxy indicia into the save-as field for the candidate file name.

In accordance with embodiments herein, a computer program product is provided that comprises a non-signal computer readable storage medium comprising computer executable code to perform resource theme identification (RTI) by automatically; accessing an active resource that includes a path designator (PD) element that includes at least a portion of a path designator for at least one of the active resource or a destination resource; analyzing the active resource at a computing device to identify content elements, the content elements including one or more text/image elements, the text/image element including at least one of a text element, an audio element or an image element related to one or more themes associated with one of the active resource or the destination resource; analyzing the text/image element utilizing an RTI algorithm, that applies at least one of natural language understanding (NLU) or image recognition (IR), to identify the one or more themes; deriving proxy indicia based on the one or more themes; substituting, into the active resource, the proxy indicia for the path designator to present the proxy indicia in place of the path designator, the proxy indicia linked to the path designator; and displaying the active resource including the proxy indicia.

Additionally or alternatively, the executable code is configured to utilize the RTI algorithm to identify the one or more themes to represent at least one of: i) a subject or topic discussed in the text of the electronic message, or ii) a subject or topic presented in still images or video within the electronic message. Additionally or alternatively, the executable code is configured to utilize the NLU and IR algorithms separately, or in combination, to identify the one or more themes associated with the corresponding content elements.

DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, and/or the like. In other instances, well-known structures, materials, or operations are not shown or described in detail to avoid obfuscation. The following description is intended only by way of example and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

The term "resource" as used throughout, shall mean a resource (e.g., SMS text message, email, webpage, Word file, Excel file, Notes board) presented on a display to the user and containing one or more content elements.

The term "active resource" as used throughout, shall mean a resource presented on a display to a user in connection with operation of an application. For example, an active resource may represent a webpage presented on a browser, an email message presented through a personal information manager, such as Microsoft outlook, and the like. As another example, an active resource may represent a document opened in a document management application, separately or in combination with one or more windows opened within the document management application, such as a Word document, an Excel spreadsheet, a PowerPoint presentation and the like.

The term "destination resource" as used throughout, shall mean a resource (e.g., window, webpage, etc.) having an address designated by a path designator where a full or partial path designator is presented within an active resource. A destination resource is not "active" until an application navigates away from a currently active resource to the destination resource, such as by selecting the path designator.

The term "content element" as used throughout, refers to a section or portion of a resource that includes a common type of content, such as a section of a webpage, file, etc. that include one of text, image(s), audio or video information, script components, a URL, or a record locator. The content element may represent e-mail content, short message service (SMS) content (e.g., text message), text content, image content, video content, a record locator, a URL, a telephone number, personal content information (e.g., address), credentials (e.g., password), multi-factor authentication, account profile information, financial payment numbers, (e.g., credit card, PayPal, debit card) and/or the like. The content element may also represent a script-based element, for which one or more scripts are to be executed before a browser can render and display an executed script (e.g., graphics, text, images, video, audio and the like). The content element may also represent auto activated element that begin to play automatically when opened in a browser.

The terms "text/image element" and "TI element" shall mean at least one of a text element and/or an image element. The term image element shall include still image elements and/or video image elements.

The term "proxy library" is used generally to refer to any type of memory section that is managed to store relations between resource locators and proxy strings as described herein. The "proxy library" may store content in various formats at a common discrete location and/or distributed across multiple storage locations, such as multiple servers, cloud resources, and/or the like.

The term "theme" shall mean a subject or topic of an electronic message and/or a subject of a resource.

The terms "resource theme identification algorithm" and "RTI algorithm" shall mean machine learning and other advanced algorithms that utilize natural language understanding (NLU), image recognition, gesture recognition and the like, to identify a theme based on analysis of content elements within an active resource and/or content elements within a destination resource (designated by a resource locator in an active resource). Nonlimiting examples of NLU artificial intelligence software configured to understand inputs made in the form of sentences in text elements or speech elements. At least some NLU architectures utilize a lexicon of one or more languages, a text parser, grandma rules, semantic theories, and logical inferences to break sentences and phrases into internal representations and formal meaning representations. Nonlimiting examples of image recognition algorithms include object or facial recognition algorithms, scale invariant feature transform (SIFT), speeded up robust features (SURF), principle component analysis (PCA), linear discipline it analysis (LDA) analysis and the like. Image recognition algorithms analyze still image elements and/or video image elements to identify internal representations. The NLU, image recognition, gesture recognition and other algorithms may be utilized alone or in combination to derive one or more themes from corresponding content elements. For example, the machine learning algorithm may be configured based on the measuring of historical responsiveness based on text copied from the various content elements. The machine learning algorithm is adjusted over multiple iterations based on the observations and/or data. For example, the machine learning algorithm is adjusted by supervised learning, unsupervised learning, and/or reinforcement learning. Non-limiting examples of machine learning algorithms are a decision tree, K-means, deep learning, artificial neural network, and/or the like.

The term "path designator" shall refer to all or a portion of an address of a specific webpage, file or other resource available on a computer computing device, computer network or other memory. For the avoidance of doubt, a full path designator shall include each of the following: i) a memory designator of the computing device, computer network or memory where the resource is stored, ii) a folder designator of a folder and/or subfolder that includes the resource and iii) a file name designator of the specific resource. A partial path designator shall include one or more of the following, associated with a specific webpage, file or other resource: i) a memory designator of the computing device, computer network or memory where the resource is stored, ii) a folder designator of a folder and/or subfolder that includes the resource and/or iii) a file name designator of the specific resource.

The term "URL" shall mean a uniform resource locator which is an address of a specific webpage, file or other resource available on a computing device, computer network (e.g., the Internet) or other memory. A URL represents an example of one type of full path designator.

The terms "resource locator" and "RL" shall refer to a full path designator or a partial path designator. For the avoidance of doubt, a resource locator may represent a file name designator of a specific webpage, file or other resource, alone or in combination with, all or a portion of the memory and path designators of the specific webpage, file or other resource. For example, the RL may represent a URL and an address, including a file name, of a resource stored on a computing device, network or other memory. For example, the RL may represent a URL which is an address of a webpage on the Internet. As another example, the RL may represent an address, on an electronic device, network or other memory, of a Word file, Excel file, Notes board or other file. As another example, the RL may represent an address of an SMS text message or email in a memory. For the avoidance of doubt, a record locator may include a leading portion that designates a memory device (e.g., J:drive; C:drive; D:drive), and one or more path names to corresponding folders and sub-folders on the memory device. The record locator may further include a trailing portion that represents a file name.

The term "parsing", in the context of a resource, shall mean analyzing and converting a program into an internal format that a runtime environment can run, for example the JavaScript engine inside browsers. As a further example, a browser parses HTML into a DOM tree. The HTML parsing involves tokenization and tree construction. HTML tokens include start and end tags, as well as attribute names and values. The parser parses tokenized input into the document, building up the document tree. When an HTML parser finds non-blocking resources, such as an image, the browser will request those resources and continue parsing. Parsing can continue when a CSS file is encountered, but <script>tags— particularly those without an async or defer attribute— blocks rendering, and pauses parsing of HTML. When a browser encounters CSS styles, it parses the text into the CSS Object Model (or CSSOM), a data structure it then uses for styling layouts and painting. The browser then creates a render tree from both these structures to be able to paint the content to the screen.

Figure 1:
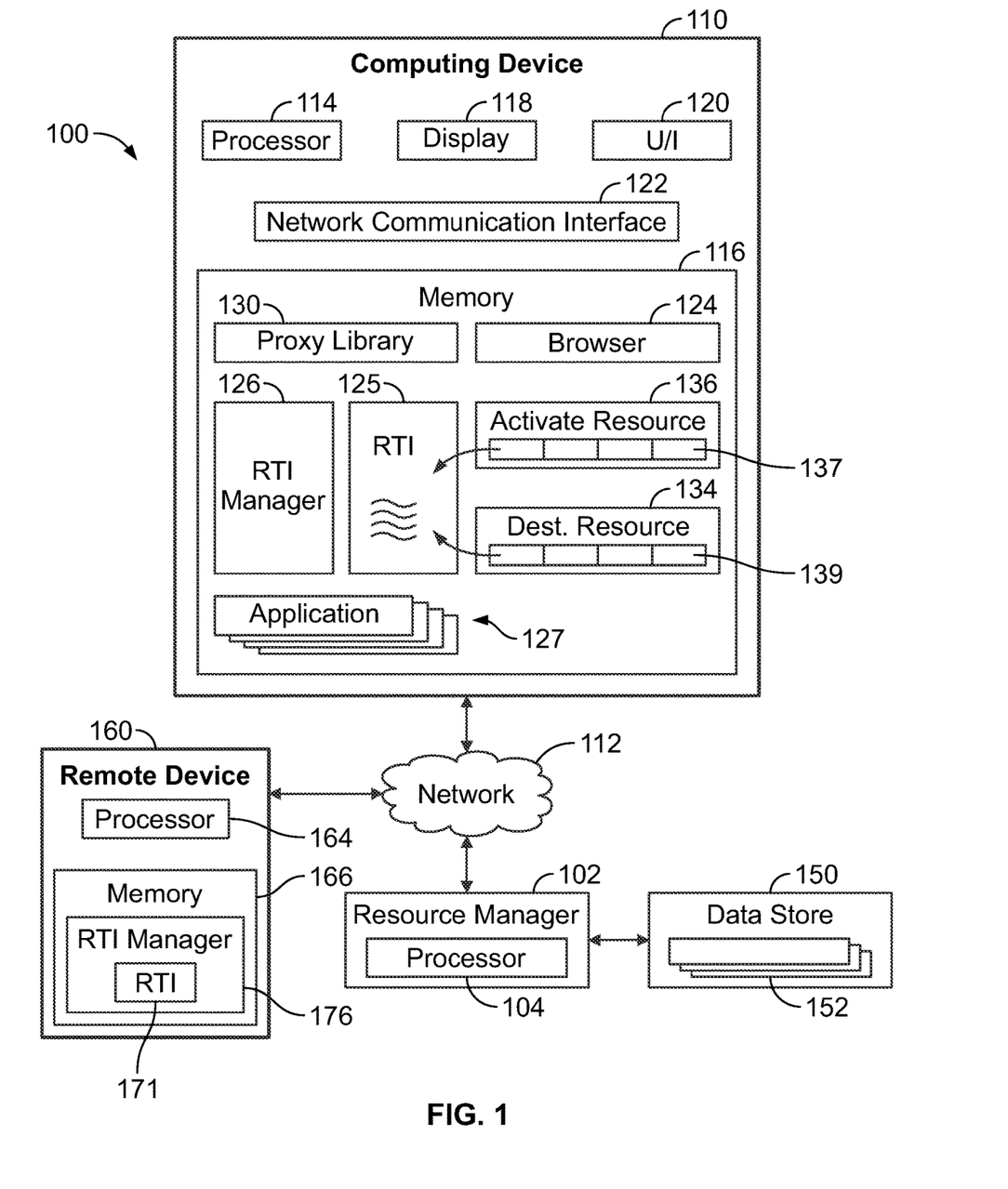
FIG. 1 illustrates a system implemented to automatically identifying themes based on resource theme identification in accordance with embodiments herein.

FIG. 1 illustrates a system implemented in accordance with embodiments herein to automatically identify themes and derive proxy indicia based on the themes. The system 100 includes one or more resource managers 102 that manage and otherwise provide access to one or more data stores 150 that store network resources 152. The resource managers 102 communicate with one or more computing devices 110 through one or more networks 112, to provide access to the applications (network resources 152). The networks 112 may represent the World Wide Web, a local area network, a wide area network, and/or the like. The computing devices 110 may represent various types of electronic devices (e.g., digital personal assistant, virtual assistant, intelligent digital assistant, client device, and/or the like) including, but not limited to, a smartphone, a cell phone, a laptop, a computer, a tablet device, and/or the like. Optionally, the system 100 includes one or more remote devices 160 that build and maintain a resource theme identification (RTI) model or algorithm. Optionally, the computing devices 110 may build and maintain the RTI algorithms/models instead of or in addition to the RTI library maintained by the remote device 160.

The resource manager 102 may represent a server or other network-based computing environment. The resource manager 102 may represent a single computer system or a collection of computer systems located at a common location or geographically distributed. The resource manager 102 includes one or more processors 104 and memory 116, among other structures that support the operation of the resource manager 102. Optionally, the resource manager 102 may be included on the computing device 110. The data store 150 may store the network resources 152 organized in various manners and related to a wide variety of topics and content. As non-limiting examples, collections of network resources 152 may be organized and maintained in connection with websites, web pages, blogs, social media, documents and/or the like.

The computing device 110 includes one or more processors 114, memory 116, a display 118, a user interface 120 and a network communications interface 122. The display 118 and user interface 120 collect information from and present information to the user in connection with various operations and applications implemented by the computing device 110. The network communications interface 122 facilitates communication through the network 112 with the resource manager 102.

The memory 116 stores various data, programs, applications and the like. In connection with embodiments herein, the memory 116 stores a resource theme identification (RTI) manager 126 that implements operations as described herein. The memory 116 further stores one or more RTI models or algorithms 125 implemented by the RTI manager 126 to perform operations as described herein. The memory 116 further stores a proxy library 130 that stores linking relations between proxy indicia and path designators. Optionally, the computing device 110 may utilize a browser 124 that is operated in connection with one or more applications 127 to navigate between source and destination resources 134, 136.

The application 127 may represent various types of applications, such as network related applications that interact with a remote network resource. When the application 127 represents a network related application, the browser 124 may be utilized to initiate a browser session at the computing device 110. The browser 124 since various request to the network resource (e.g., resource manager 102) and in response thereto, receives network resources, one or more of which may represent an active destination resource. The RTI manager 126 monitors operation of the browser 126 to determine when a network resource is accessed. The RTI manager is configured to access an active resource and determine whether the active resource includes a path designator (PD) element. As explained herein, PD elements include at least a portion of a path designator for at least one of the active resource or a destination resource. The RTI manager 126 is further configured to analyze the active resource to identify content elements. For example, the RTI manager 126 may analyze an active resource 136 to segment and separate content segments 137. Additionally or alternatively, the RTI manager 126 may identify a destination resource 134 that is designated by a PDE element within the active resource 136. The RTI manager 126 may analyze the destination resource 134 to segment and separate content elements 139. The content elements include one or more text/image elements. The text/image element including at least one of a text element, an audio element or an image element related to one or more themes associated with one of the active resource or the destination resource.

The RTI manager 126 implements one or more RTI models/algorithms that are configured to analyze the text/ image element. The RTI algorithm applies at least one of natural language understanding (NLU) or image recognition (IR), to identify the one or more themes. The RTI algorithm or model 125 may execute one or more machine learning algorithms to identify the one or more themes. The processors 114 may execute a decision tree, K-means, deep learning, artificial neural network, and/or the like.

The RTI manager 126 derives proxy indicia based on the one or more themes, and substitutes, into the active resource, the proxy indicia for the path designator to present the proxy indicia in place of the path designator. The RTI manager 126 maintains a link between the proxy indicia and the path designator in the proxy library 130. The display 118 displays the active resource including the proxy indicia.

As explained herein, the active resource may represent an electronic message that is opened by an electronic messaging application (e.g., one of applications 127) operated by the one or more processors on the computing device. The analyzing operation may include applying the NLU algorithm to one or more text elements within the electronic message to identify the one or more themes. Additionally or alternatively, the analyzing operation may apply the IR algorithm to one or more image elements within the electronic message to identify the one or more themes. Additionally or alternatively, the analyzing operation may apply, as the IR algorithm, a video recognition (VR) functionality to identify at least one of gestures or other video components of one or more video elements within the electronic message to identify the one or more themes. The NLU and IR algorithms separately, or in combination, identify the one or more themes associated with the corresponding content elements. For example, the RTI algorithm may identify the one or more themes to represent at least one of: i) a subject or topic discussed in the text of the electronic message, or ii) a subject or topic presented in still images or video within the electronic message. As a further example, the one or more themes include one or more of: i) a designation of an entity, ii) a purpose or request, iii) an action to be taken.

In accordance with further embodiments, the active resource may include a document opened in a document management program (e.g., one of applications 127) and a save window opened in the document management program. The RTI manager 126 is further configured to identify a text string located at a beginning of the document. The display is configured to display, as at least a portion of the PD element, the text string in a save-as field in the save window (e.g., see FIG. 9) as a prepopulated candidate filed name, where the candidate file name representing the PD element. Additionally or alternatively, the RTI algorithm applies the NLU to the one or more text/image elements in the document to identify the one or more themes and substitutes the proxy indicia into the save-as field for the candidate file name.

The computing device 110 represents an example of one configuration in which a single computing device may be configured to perform the automated RTI analysis, proxy indicia derivation and substitution of proxy indicia for a PD element. Additionally or alternatively, the assessing, analyzing, deriving, substituting and displaying operations described herein may be distributed between various computing devices, such as a remote device 160 and a resource manager 102. The remote device 160 may represent a server or other network-based computing environment. The remote device 160 may represent a single computer system or a collection of computer systems located at a common location or geographically distributed. The remote device 160 includes one or more processors 164, memory 166, a display, a user interface and a network communications interface. The display and user interface collects information from and present information to the user in connection with various operations and applications implemented by the remote device 160. The network communications interface facilitates communication through the network 112 with the resource manager 102 and numerous computing devices 110.

The memory 166 stores various data, programs, applications and the like. In connection with embodiments herein, the memory 166 stores and RTI manager 176. The memory 166 further stores and RTI model/algorithm 171 implemented by the RTI manager 176 to perform operations as described herein. The memory 166 further stores a proxy library (not shown) to maintain links between proxy indicia and PD elements.

The RTI manager 176 may execute one or more machine learning algorithms (MLA) 171 stored in the memory 166 to build and update the RTI transfer library 180. The processors 164 may execute a decision tree, K-means, deep learning, artificial neural network, and/or the like. To build and update the RTI transfer library 180, the MLA 171 monitors operations performed by the computing device 110 periodically, over an extended period of time, during a learning mode or otherwise. The RTI manager 126, utilizing the MLA 121, monitors and track user actions in connection with the opening, accessing and closing resources (e.g., web pages, application windows) during operation of the computing device 110. The RTI manager 126 monitors and tracks the user interactions in search of action sequences representing all or part of "transfer actions". When the RTI manager 126 identifies a transfer action, the RTI manager 126 performs operations described herein to build or update a transfer action 172 in the RTI transfer library 180.

The RTI manager 176 may be configured to apply the NLU algorithm to one or more text elements within the electronic message to identify the one or more themes. Additionally or alternatively, the RTI manager 176 may be configured to apply the IR algorithm to one or more image elements within the electronic message to identify the one or more themes. The IR algorithm may represent video recognition (VR) functionality to identify at least one of gestures or other video components of one or more video elements within the electronic message to identify the one or more themes. The memory 116, 166 is configured to store the document management program. The active resource including a document opened in the document management program and a save window opened in the document management program. The one or more processor 164 are configured to: identify a text string located at a beginning of the document and to manage a display to display the text string into a save-as field in the save window as a prepopulated candidate filed name, the candidate file name representing the PD element. The one or more processors 164 are configured to apply the NLU to the one or more text/image elements in the document to identify the one or more themes and to substitute the proxy indicia into the save-as field for the candidate file name.

Figure 2:
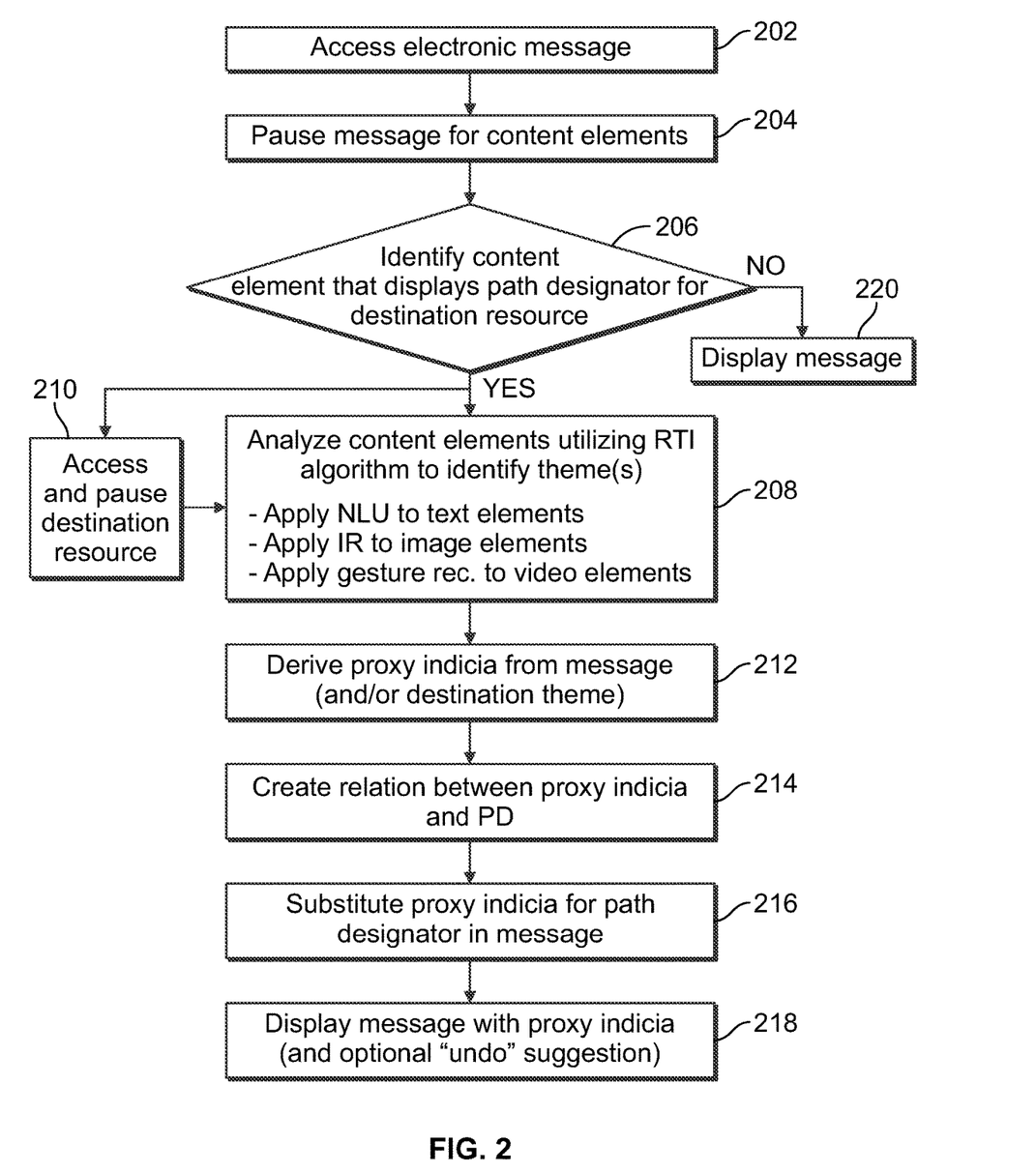
FIG. 2 illustrates a method that, under control of one or more processors that include program instructions, performs automatic resource theme identification in accordance with embodiments herein.

FIG. 2 illustrates a method that, under control of one or more processors that include program instructions, performs automatic resource theme identification (RTI) in accordance with embodiments herein.

At 202, one or more processors access an active resource (e.g., an electronic message) at a computing device. For example, the access may represent opening an electronic message by the processors 114, 164 within a messaging application, such as an email, text message and the like. Additionally, or alternatively, the access may include a determination by the one or more processors that a new electronic message has been received by the messaging application at the computing device 110 or remote device 160.

At 204, the one or more processors parse the electronic message to identify and separate content elements within the electronic message. Various examples of content elements are described herein. The content elements may include one or more path designator (PD) elements and/or text/image elements. When present, the PD element is displayed, within an electronic message, as all or a portion of a path designator for a destination resource, where the destination resource is separate from the current electronic message. When present, the text/image element may include at least one of a text element, an audio element or an image element related to a theme, where the theme is also associated with the destination resource. The parsing of the active resource may be performed in various manners. For example, the one or more processors may implement a simplified parsing process, such as applying a segmentation algorithm to separate portions of the electronic message that include text from portions of the electronic message that include images/video/audio, and similarly from portions of the electronic message that include path designators. Additionally, or alternatively, the one or more processors may implement a parsing or "scraper" process similar to parsers utilized with webpages. Nonlimiting examples of parsers include the Scraper Parser offered by parser.me, Octoparse web scraper, ParseHub web scraper, Import.io, Outwit Hub, and the like. Other nonlimiting examples of parsers are described in U.S. Patent Application 2017/0315982; U.S. Patent Application 2018/0189414; U.S. Patent Application 2018/0032489; and U.S. Patent Application 2020/293581, all of which are incorporated reference in their entireties.

At 206, the one or more processors determine/identify whether one or more of the electronic message includes a PD element that displays at least a portion of a path designator for a destination resource. At 206, the one or more processors may alternatively determine that either the electronic message does not include any PD elements or the PD element displays non-PD indicia, such as text or graphic indicia. To further explain this point, attention is directed to FIG. 3.

Figure 3:
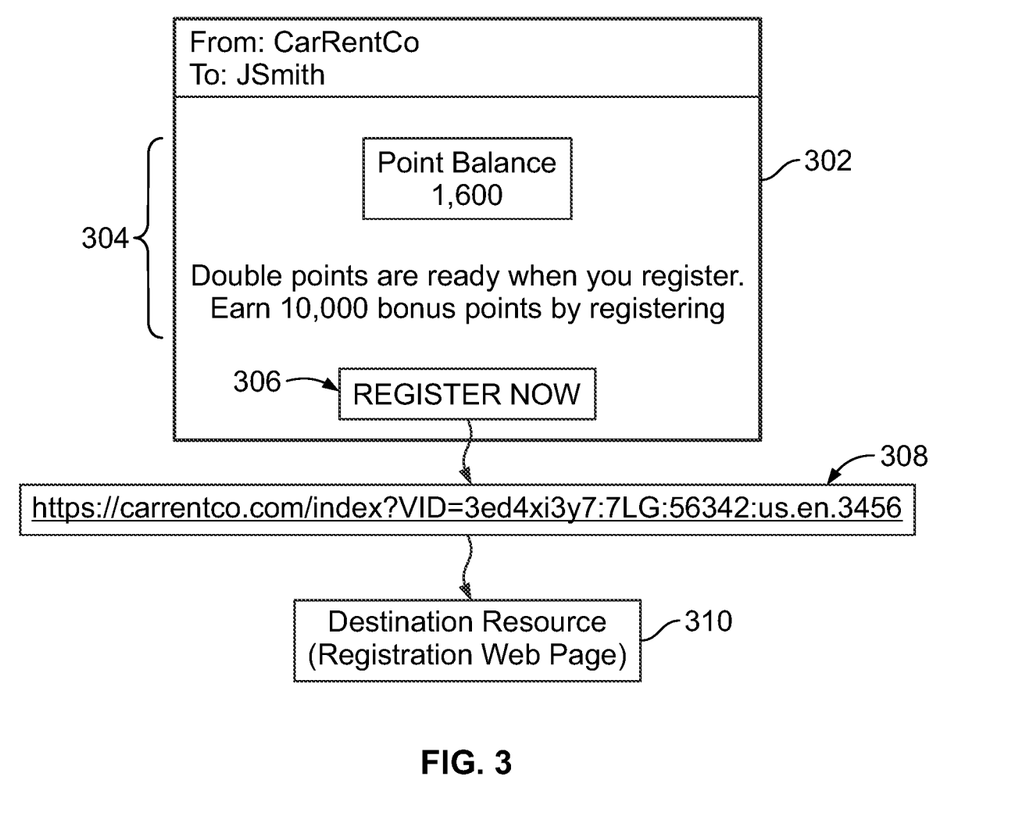
FIG. 3 illustrates an example of an electronic message that may be analyzed in accordance with embodiments herein.

FIG. 3 illustrates an example of an electronic message that may be analyzed in accordance with embodiments herein. An electronic message 302 includes a text element 304 followed by a PD element 306 that displays non-PD indicia. For example, the email 302 may include the text element 304 which states "Double points are ready when you are. Register for the Plus Your Points promotion to earn double points and more through Jan. 31, 2021. Earn 20 bonus points just for registering!\*\*". The text element 304 is followed by a PD element 306. The PD element 306 is associated with a path designator 308 (which is not displayed) providing a link to a destination resource 310. The PD element 306 may be presented in different manners. In the example of FIG. 3, the PD element 306 displays non-PD indicia such as text or graphic indicia (e.g., "REGISTER NOW"). The foregoing example of non-PD indicia does not display the underlying path designator to the destination resource. Alternatively, the PD element 306 may not include text or graphic indicia, instead may include the actual path designator, such as https://carrentco.com/index?UID=3edxi3y7:TLG:56342:US.en.3/456.

Figure 4:
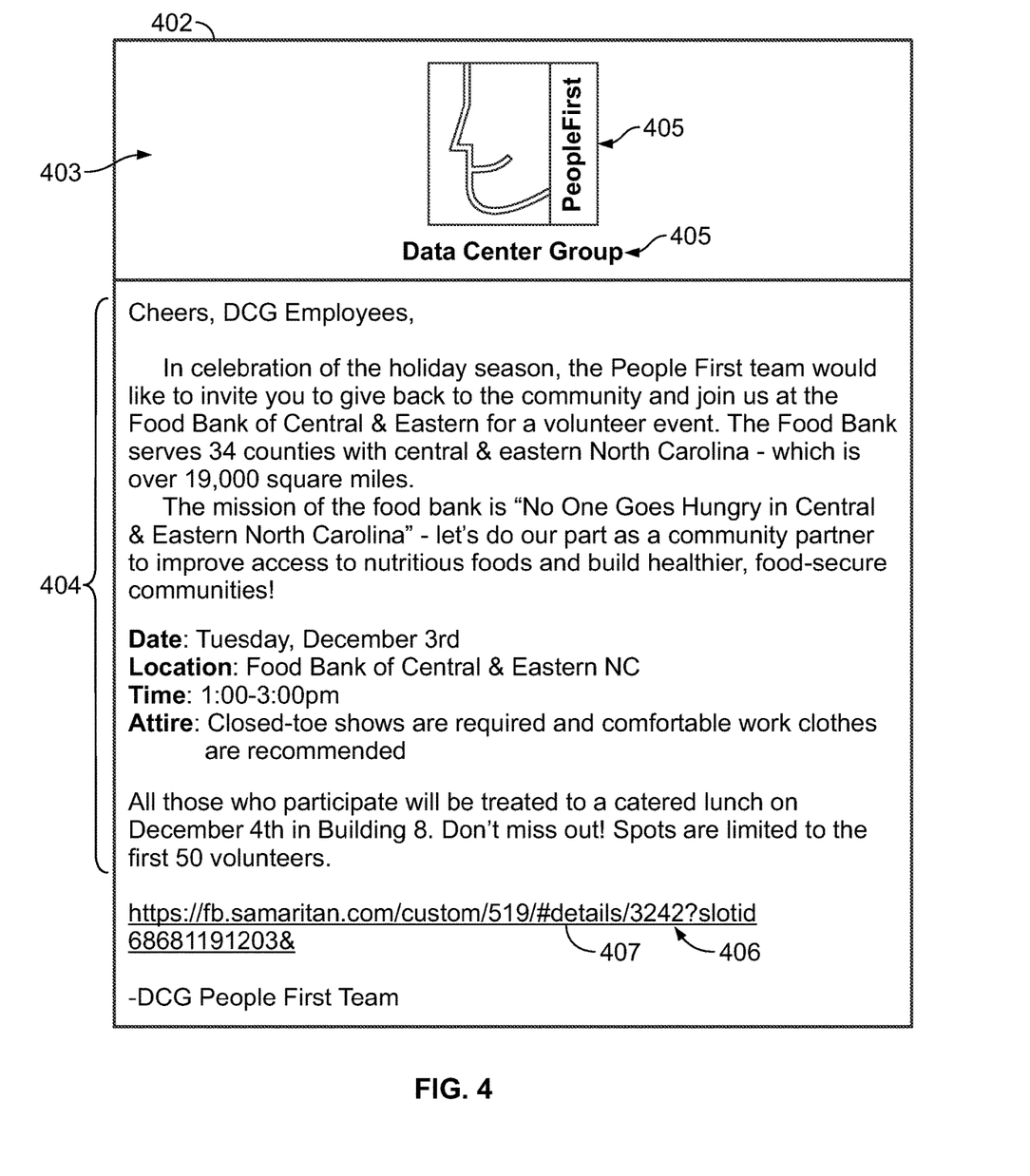
FIG. 4 illustrates an example of an alternative electronic message that may be analyzed in accordance with embodiments herein.

FIG. 4 illustrates an example of an alternative electronic message that may be analyzed in accordance with embodiments herein. The electronic message 402 includes an image element 403 which includes text 405, a text element 404 and a PD element 406. The PD element 406 displays a complete path designator 407 to a destination resource.

Returning to FIG. 2, when the electronic message is determined either i) to not include a PD element or ii) to include a PD element that is formatted with non-PD indicia, flow moves to 220. At 220, the one or more processors display the electronic message in the original form as the electronic message was received without any substitutions of proxies for path designators. Alternatively, when the one or more processors identify one or more PD elements and determined that the one or more PD elements merely illustrate all or a portion of a path designator, flow moves to one or both of 208 and 210.

At 208, the one or more processors analyze the PD element that was identified to present a path designator. The content elements of the electronic message and the PD element are analyzed utilizing an RTI algorithm to identify a theme therein. The RTI algorithm may include applying a natural language understanding (NLU) algorithm to one or more text elements within the electronic message. Additionally, or alternatively, the RTI algorithm may apply an image recognition (IR) algorithm to one or more image elements within the electronic message. The IR algorithm may be configured to analyze still images and/or may include video recognition (VR) functionality to identify gestures and other video components of one or more video elements within the electronic message. The NLU and IR algorithms separately, or in combination, identify a theme associated with the corresponding content elements. By way of example, the RTI algorithm may identify the theme to represent a subject or topic discussed in the text of the electronic message, a subject or topic presented in still images or video within the electronic message. The theme may be simple or complex. For example, a theme may include one or more of a designation of a company (e.g., "company ABC"), organization (e.g., "food bank", "blood Drive"), purpose or request of a message (e.g., "donate", "volunteer"), action to be taken by the reader (e.g., "sign up"), and the like.

At 210, the one or more processors perform an optional operation, namely to access a destination resource indicated by the path designator (identified at 206). At 210, the one or more processors further parse through the destination resource to identify content elements therein. At 210, the one or more processors pass all or a portion of the content elements to the RTI algorithm to be analyzed at 208.

At 208, the RTI algorithm analyzes the content elements from the destination source as described above to identify one or more themes from the PD element, text elements and/or image elements (including still image elements and/or video image elements). The theme derived at 208 may be based solely on the content elements within the electronic message, solely based on the PD element, solely based on the content elements within the destination resource, or a combination thereof. When multiple themes are identified, the one or more processors may further analyze the themes relative to one another to determine whether the themes correlate with one another. For example, the theme derived from the electronic message may indicate a food bank seeking donors, but not have a clear source/company in the electronic message. The theme derived from the destination resource may also indicate a food bank seeking donors and/or volunteers and include a source company making the request or managing the food bank. In the present example, at 208, the one or more processors may combine the first and second themes derived from the electronic message and the destination resource to generate a theme indicating the source company, a food bank and seeking donors and/or volunteers.

Additionally or alternatively, the one or more processors may be configured to manage a situation in which first and second themes from the electronic message and destination resource, respectively, appear to differ in one or more substantive manners (e.g., do exhibit a sufficient level of correlation). For example, when a first theme is identified based on the electronic message (e.g., company ABC seeking volunteers for a food bank) and a different second theme is identified based on the destination resource (e.g., company X main webpage), the one or more processors may give priority to one of the first and second theme, such as to select the first theme associated with the electronic message. Alternatively, it may be preferable to prioritize the theme derived from the destination resource. For example, the content of a destination resource may be a better source for determining a theme (e.g., when the electronic message accidentally identifies the wrong company who is managing a food bank, but the path designator correctly identifies the company name).

In some instances, the RTI algorithm may be utilized to detect, through themes, when an incorrect path designator is included in an electronic message. For example, embodiments herein may facilitate identification of path designators that are unrelated to an electronic message. An incorrect path designator may be included accidentally or intentionally, such as to mislead the reader. For example, an email or text message may be received that is purportedly from a government agency or other reputable entity, and may request the user to select a link associated with a path designator (e.g., in connection with receiving Medicare benefits, Social Security benefits, credit card theft). However, the email or text message may be from an unauthorized entity having a malicious purpose (e.g., seeking to obtain personal information). In the foregoing example, when the content of the destination resource is accessed and parsed, the RTI algorithm may determine that the theme associated with the destination resource is seeking to upload malware to the user's computing device, spam, or otherwise improper. The RTI algorithm may consequently identify the theme to be "SPAM", "UNKNOWN THIRD PARTY—MAY BE SEEKING PERSONAL INFORMATION", "DANGER—POTENTIAL MALWARE SOURCE" and the like.

The themes derived at 208 are then utilized at 212. At 212, the one or more processors derive proxy indicia based on the themes from the electronic message. Additionally or alternatively, the one or more processors may derive the proxy indicia solely from the themes derived from the destination resource and/or themes derived from a combination of the analysis of the electronic message and destination resource. The proxy indicia may represent a text string, a graphical image (e.g., an emoji), a video image, or a combination thereof In the example of FIG. 4, the one or more processors may identify themes from the body of the text element 404 and from the path designator 406 to include the company name, "volunteer", "sign up form" and "food bank." The one or more processors cross reference the themes from the various sources and based on the identified and cross-referenced themes, the one or more processors may derive the new proxy indicia to include, for example, "Company ABC food bank volunteer sign-up."

At 214, the one or more processors create and save a relation between the proxy indicia and the PD element. For example, the relation may be saved in a library or other relational memory structure. At 216, the one or more processors substitute the proxy indicia into the electronic message in place of the path designator presented in the PD element. At 218, the one or more processors display the electronic message with the proxy indicia substituted for the path designator at the location of the PD element. As an example, the proxy indicia may be overlaid on top of the PD element. Additionally, or alternatively, the path designator may be removed entirely and the proxy indicia inserted into the PD element in place thereof. Optionally, the one or more processors may also add an undo flag prompting the user whether to keep or "undo" the proxy indicia suggestion.

Figure 5:
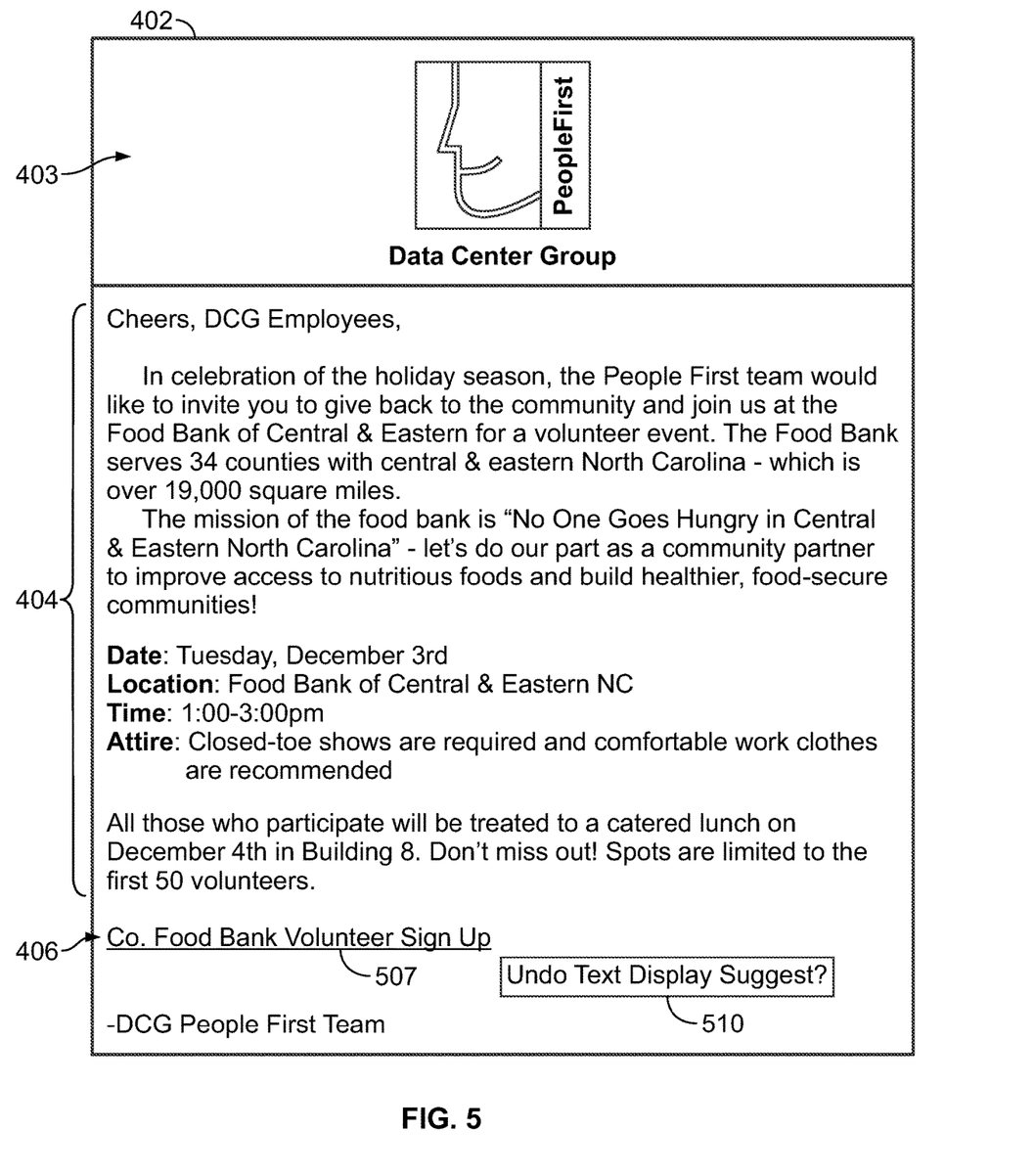
FIG. 5 illustrates an example of an electronic message that may be displayed in accordance with embodiments herein.

FIG. 5 illustrates an example of an electronic message that may be displayed in accordance with embodiments herein. The electronic message in FIG. 5 corresponds to the electronic message in FIG. 4 and thus common reference numerals are provided therein for common elements. In FIG. 5, the electronic message 402 continues to present an image element 403, and text element 404. The PD element 406 has been modified to display proxy indicia 507 in place of the original path designator 407 in the PD element 406. FIG. 5 further illustrates an example of an undo flag 510 may prompt the user as to whether to keep or undo the proxy indicia suggestion (e.g., Undo Text Display Suggestion?).

The user may select the undo flag 510 when the user desires to see the original path designator, and not the proxy indicia. When the undo flag 510 is selected, the one or more processors replace the proxy indicia 507 with the original path designator 407. It is recognized that various types of undo flags may be presented and that the manner in which a user accepts or declines an undo flag may vary.

Figure 6:
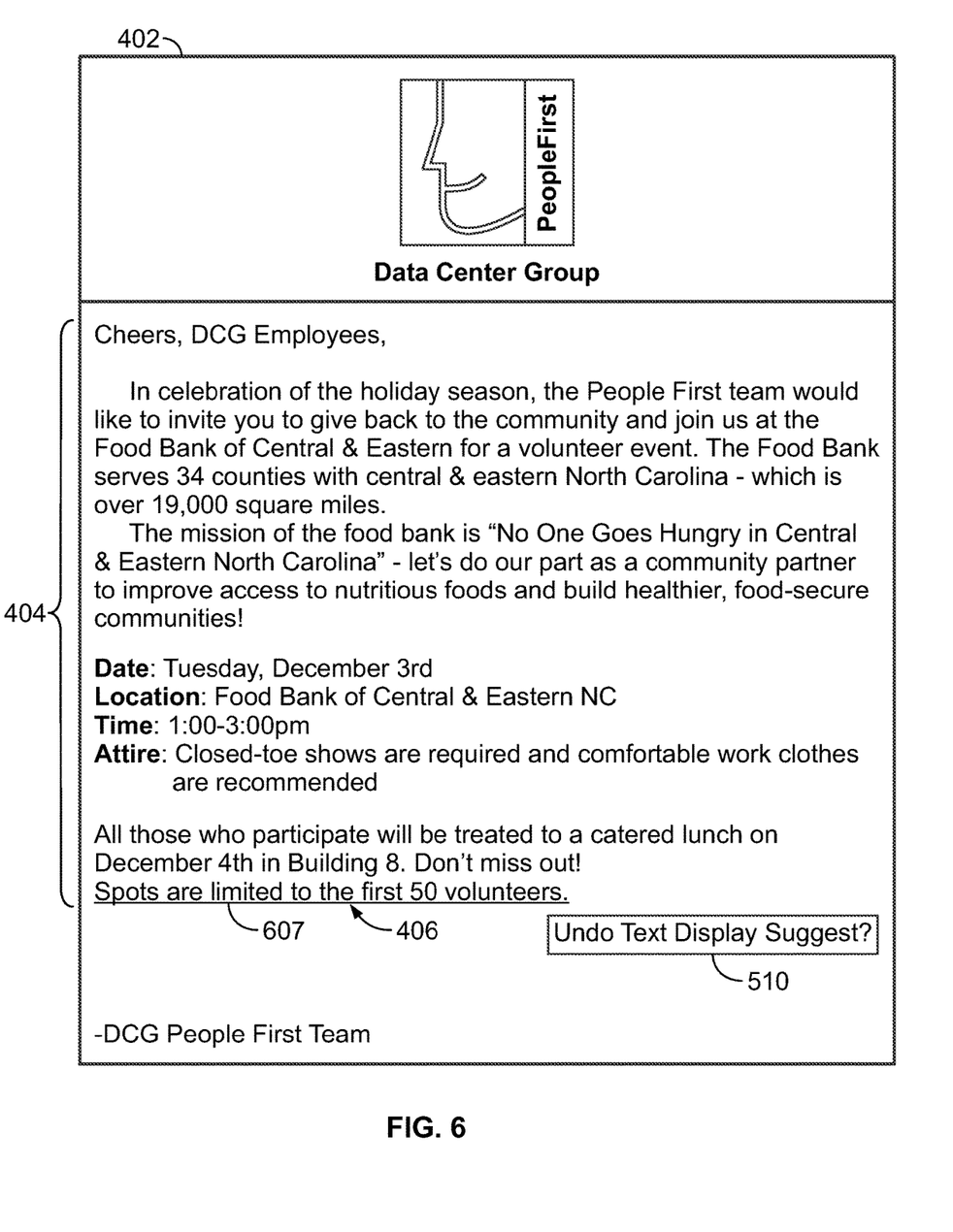
FIG. 6 illustrates an example of an electronic message that may be displayed in accordance with embodiments herein.

Additionally or alternatively, the proxy indicia may be derived from existing text in the body of the electronic message and/or destination resource. FIG. 6 illustrates an example of an electronic message that may be displayed in accordance with embodiments herein. The electronic message in FIG. 6 corresponds to the electronic message in FIG. 4 and thus common reference numerals are provided therein for common elements. In FIG. 6, the electronic message 402 continues to present an image element 403, and text element 404. The PD element 406 has been modified to display proxy indicia 607 in place of the original path designator 407 in the PD element 406. In accordance with the embodiment of FIG. 6, the one or more processors continue to identify themes based on the text elements in the electronic message and the path designator. Based on the identified and cross-referenced themes, the one or more processors select an existing text string from the body of the electronic message to utilize as the proxy indicia. In the present example, the one or more processors select the phrase "Spots are limited to the first 50 volunteers" which appears in the original electronic message. The selected phrase 607 from the text content of the original electronic message is linked to the PD element 406 to form a hyperlink. The one or more processors create a relation (at 214) between the select phrase 607 and the path designator. When the phrase 607 is selected, the one or more processors identify the corresponding path designator from the library or other relational data structure and access the destination resource.

FIG. 6 further illustrates the undo flag 510 which may prompt the user as to whether to keep or undo the proxy indicia suggestion. The user may select the undo flag 510 when the user desires to see the original path designator, and not the proxy indicia.

Figure 7:
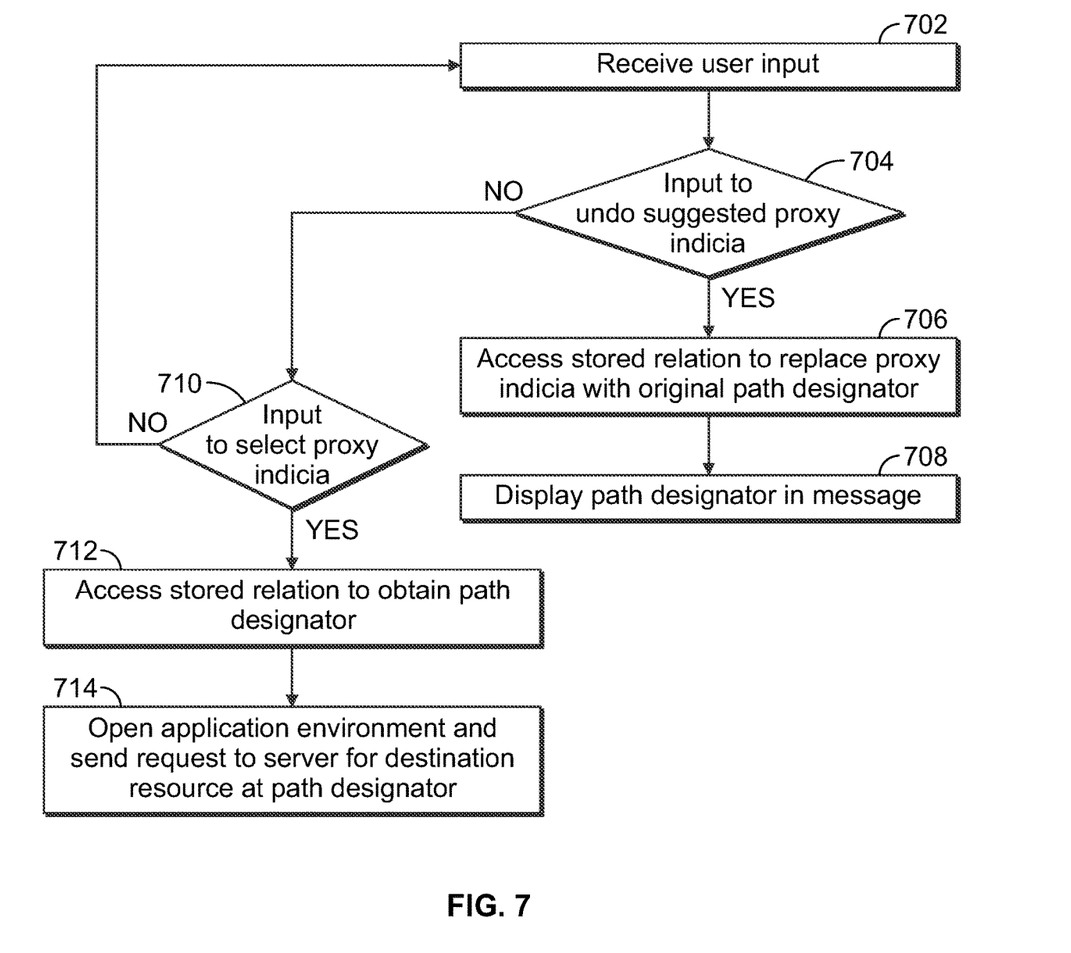
FIG. 7 illustrates a process to access a destination resource in accordance with embodiments herein.

FIG. 7 illustrates a process to access a destination resource in accordance with embodiments herein. At 702, the one or more processors receive a user input in connection with the electronic message displayed. At 704, the one or more processors determine whether the user input is an instruction to "undo" the proxy indicia suggestion. For example, in connection with FIGS. 5 and six, the user may select the undo flag 510. When the input corresponds to a undo operation, flow moves to 706. At 706, the one or more processors access the stored relation to obtain the original path designator. At 706, the one or more processors replace the proxy indicia with the original path designator. At 708, the one or more processors display the electronic message in the original form including the path designator (e.g., returning to the format presented in FIG. 4).

Returning to 704, when the input is not an undo indication, flow moves to 710. At 710, the one or more processors determine whether the user input has selected the proxy indicia. If not, the input is processed in accordance with various conventional manners and flow returns to 702. Alternatively, when the input selects the proxy indicia, flow moves to 712. At 712, the one or more processors access the stored relation to obtain the path designator corresponding to the proxy indicia. At 714, the one or more processors open up an application environment associated with the path designator and send a request to a remote server requesting the destination resource associated with the path designator. For example, when the path designator corresponds to a webpage, the one or more processors may open up a web browser and send a request to a remote Web server for the corresponding webpage. It is recognized that other types of application environments may be accessed and other types of destination resources may be requested.

Figure 8:
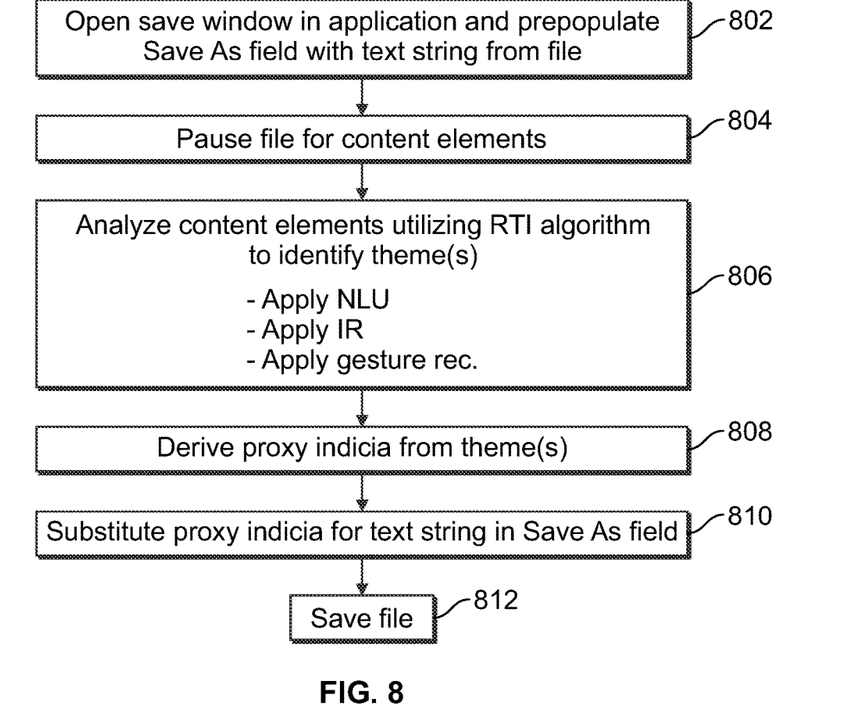
FIG. 8 illustrates a method that, under control of one or more processors that include program instructions, performs automatic RTI in accordance with embodiments herein.

FIG. 8 illustrates a method that, under control of one or more processors that include program instructions, performs automatic RTI in accordance with embodiments herein. At 802, the one or more processors access an active resource at a computing device, where the active resource represents a "save" window opened within a document management program, such as the Word software program, Excel® software program, PowerPoint® software program by Microsoft Corporation. At 802, the one or more processors performs a further optional operation to pre-populate the "save as" field within the save window with a text string as a suggested title for the document being saved. The pre-populated suggestion represents the initial text string in the content of the document. Optionally, the save as field may be left blank without a pre-populated suggestion.

Figure 9:
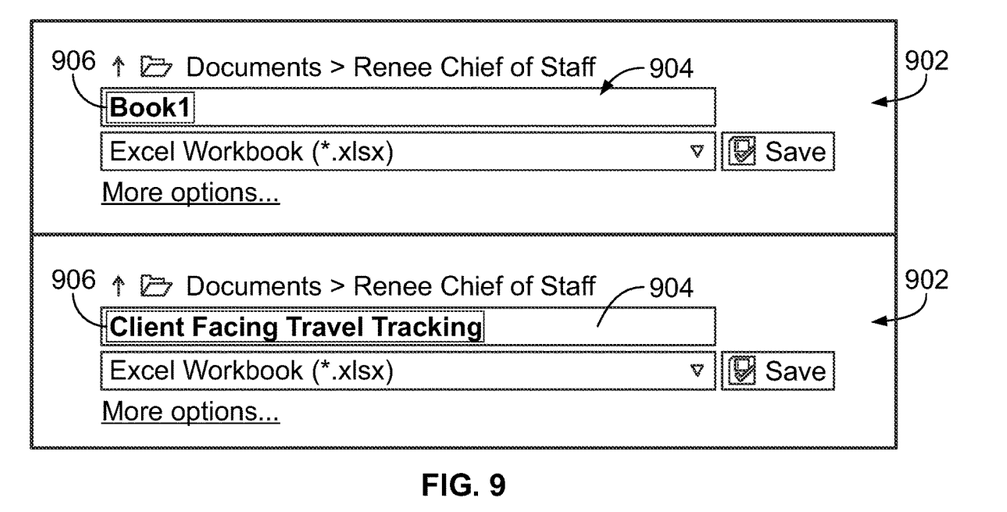
FIG. 9 illustrates examples of an initial save window and a save window with proxy indicia substituted therein, in accordance with embodiments herein.

FIG. 9 illustrates examples of an initial save window and a save window with proxy indicia substituted therein, in accordance with embodiments herein. The initial save window 902 may be opened and first presented when a user selects the "save" option from the menu bar within the document management program. The save window 902 includes a save as field 904 that includes a pre-populated suggested name 906 for the file.

Returning to FIG. 8, at 804, the one or more processors parse at least a portion of the document to identify one or more content elements therein. Optionally, the parsing operation at 804 may be omitted entirely.

At 806, the one or more processors analyze the content elements utilizing one or more RTI algorithms to identify one or more themes. As explained herein, the RTI algorithm may apply in NLU algorithm, an IR algorithm with respect to still images, an IR algorithm with respect to video (which may include gesture recognition). Additionally or alternatively, the parsing operation may be omitted and the one or more processors may apply the RTI algorithm to the entire content of the document, or to a predetermined section of the document.

At 808, the one or more processors derive proxy indicia based on the one or more themes identified from the content of the document. The proxy indicia may represent a text string, a graphical image (e.g., an emoji), a video image, or a combination thereof. At 810, the one or more processors substitute the proxy indicia into the save as field in place of the pre-populated suggested name. Returning to FIG. 9, the bottom panel illustrates the save window 902, but with the proxy indicia 910 inserted into the save as field 904 in place of the pre-populated suggested name. Optionally, the one or more processors may also add an undo flag prompting the user whether to keep or "undo" the proxy indicia suggestion.

If the user agrees with the filename presented in the proxy indicia, the user may utilize the proxy indicia as the filename by selecting the save button. Alternatively, if the user desires to modify or entirely replaced filename, the user may do so by typing or otherwise entering modifications to the proxy indicia or replacing the proxy indicia entirely. At 812, the one or more processors save the document/file utilizing a path designator ending with the filename from the save as field.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", "one or more of A or B" and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
    under control of one or more processors included program instructions to perform resource theme identification (RTI) automatically;
    accessing an active resource that includes a path designator (PD) element that includes at least a portion of a path designator for at least one of the active resource or a destination resource;
    analyzing the active resource at a computing device to identify content elements, the content elements including one or more text/image elements, the text/image element including at least one of a text element, an audio element or an image element;
    analyzing the text/image element utilizing an RTI algorithm, that applies at least one of natural language understanding (NLU) or image recognition (IR), to identify one or more themes associated with at least one of the active resource or the destination resource;
    deriving proxy indicia based on the one or more themes;
    substituting, into the active resource, the proxy indicia for the path designator to present the proxy indicia in place of the path designator, the proxy indicia linked to the path designator; and
    displaying the active resource including the proxy indicia.

2. The method of claim 1, wherein the active resource represents an electronic message that is opened by an electronic messaging application operated by the one or more processors on the computing device.

3. The method of claim 1, wherein the analyzing operation includes applying the NLU algorithm to one or more text elements within the electronic message to identify the one or more themes.

4. The method of claim 1, wherein the analyzing operation applies the IR algorithm to one or more image elements within the electronic message to identify the one or more themes.

5. The method of claim 1, wherein the analyzing operation applies, as the IR algorithm, a video recognition (VR) functionality to identify at least one of gestures or other video components of one or more video elements within the electronic message to identify the one or more themes.

6. The method of claim 1, wherein the NLU and IR algorithms separately, or in combination, identify the one or more themes associated with the corresponding content elements.

7. The method of claim 1, wherein the RTI algorithm identifies the one or more themes to represent at least one of: i) a subject or topic discussed in the text of the electronic message, or ii) a subject or topic presented in still images or video within the electronic message.

8. The method of claim 7, wherein the one or more themes include at least one of: i) a designation of an entity, ii) a purpose or request, or iii) an action to be taken.

9. The method of claim 1, wherein the active resource includes a document opened in a document management program and a save window opened in the document management program, the method further comprising: identifying a text string located at a beginning of the document, the displaying the PD element including displaying the text string into a save-as field in the save window as a prepopulated candidate filed name, the candidate file name representing the PD element.

10. The method of claim 9, wherein the RTI algorithm applies the NLU to the one or more text/image elements in the document to identify the one or more themes and substitutes the proxy indicia into the save-as field for the candidate file name.

11. A device, comprising:
   memory to store program instructions;
   one or more processors, when executing the program instructions, to perform automatic resource theme identification (RTI) by:
      accessing an active resource that includes a path designator (PD) element that includes at least a portion of a path designator for at least one of the active resource or a destination resource;
      analyzing the active resource at a computing device to identify content elements, the content elements including one or more text/image elements, the text/image element including at least one of a text element, an audio element or an image element;
      analyzing the text/image element utilizing an RTI algorithm, that applies at least one of natural language understanding (NLU) or image recognition (IR), to identify one or more themes associated with at least one of the active resource or the destination resource;
      deriving proxy indicia based on the one or more themes; and
      substituting, into the active resource, the proxy indicia for the path designator to present the proxy indicia in place of the path designator, the proxy indicia linked to the path designator; and
   a display to display the active resource including the proxy indicia.

12. The device of claim 11, wherein the active resource represents an electronic message that is opened by an electronic messaging application operated by the one or more processors on the computing device.

13. The device of claim 11, wherein the one or more processors are configured to apply the NLU algorithm to one or more text elements within the electronic message to identify the one or more themes.

14. The device of claim 11, wherein the one or more processors are configured to apply the IR algorithm to one or more image elements within the electronic message to identify the one or more themes.

15. The device of claim 11, wherein the one or more processors are configured to apply, as the IR algorithm, a video recognition (VR) functionality to identify at least one of gestures or other video components of one or more video elements within the electronic message to identify the one or more themes.

16. The device of claim 11, wherein the memory is configured to store the document management program, the active resource including a document opened in the document management program and a save window opened in the document management program, the one or more processors configured to: identify a text string located at a beginning of the document, the display configured to display the text string into a save-as field in the save window as a prepopulated candidate filed name, the candidate file name representing the PD element.

17. The device of claim 11, wherein the one or more processors are configured to apply the NLU to the one or more text/image elements in the document to identify the one or more themes and to substitute the proxy indicia into the save-as field for the candidate file name.

18. A computer program product comprising a non-transitory computer readable storage medium comprising computer executable code to perform resource theme identification (RTI) by automatically;
   accessing an active resource that includes a path designator (PD) element that includes at least a portion of a path designator for at least one of the active resource or a destination resource;
   analyzing the active resource to identify content elements, the content elements including one or more text/image elements, the text/image element including at least one of a text element, an audio element or an image element;
   analyzing the text/image element utilizing an RTI algorithm, that applies at least one of natural language understanding (NLU) or image recognition (IR), to identify one or more themes associated with at least one of the active resource or the destination resource;
   deriving proxy indicia based on the one or more themes;
   substituting, into the active resource, the proxy indicia for the path designator to present the proxy indicia in place of the path designator, the proxy indicia linked to the path designator; and
   displaying the active resource including the proxy indicia.

19. The computer program product of claim 18, the executable code to utilize the RTI algorithm to identify the one or more themes to represent at least one of: i) a subject or topic discussed in the text of the electronic message, or ii) a subject or topic presented in still images or video within the electronic message.

20. The computer program product of claim 18, the executable code to utilize the NLU and IR algorithms separately, or in combination, to identify the one or more themes associated with the corresponding content elements.

* * * * *